United States Patent [19]

Leonard

[11] Patent Number: 4,574,971
[45] Date of Patent: Mar. 11, 1986

[54] SEALING ASSEMBLY FOR VESSELS

[76] Inventor: Clayborn T. Leonard, Rte. 3, Box 44C, Liberty, Tex. 77575

[21] Appl. No.: 685,845

[22] Filed: Dec. 24, 1984

[51] Int. Cl.$^4$ .............................................. B65D 53/00
[52] U.S. Cl. ..................................... 220/235; 138/99
[58] Field of Search ...................... 220/234, 235, 243; 138/97, 98, 99

[56] References Cited

U.S. PATENT DOCUMENTS 2,329,037  9/1943  Eisenberg ............................. 138/99
4,405,048  9/1983  Peake ................................... 138/97

Primary Examiner—George T. Hall
Attorney, Agent, or Firm—Gunn, Lee & Jackson

[57] ABSTRACT

A sealing assembly for vessels such as tanks, pipe lines etc. for preventing leakage of fluid from such vessels. The sealing assembly incorporates an inner stop member which is collapsible for passage through a hole in the wall structure of the vessel and is expandable to engage the inner surface of the vessel. A closing and sealing material is applied to the external surface of the vessel in an uncured form and extends at least partially through the hole through which the stop member passes. A retainer plate is positioned on the outer surface of the closing material and is drawn into tight retaining engagement with the closing material by means of a forcing element in the form of a screw or screws which extend through the retainer element and are received in threaded engagement with the stop element. The closing material is in the form of a polymer which is applied in the uncured state and forms a bond with the outer surface of the vessel. The retainer plate is forced into assembly with the polymer closing material by the screws to positively secure it in place.

5 Claims, 4 Drawing Figures

SEALING ASSEMBLY FOR VESSELS

FIELD OF THE INVENTION

This invention relates generally to sealing devices for stopping leaks in tanks, pipelines and other vessels and more specifically, relates to a closure assembly which may seal small holes in the vessel structure or which may be utilized to seal cracks and other such openings in vessel walls.

BACKGROUND OF THE INVENTION

In the automotive industry fuel tanks are typically formed from relatively thin sheet steel in order to keep the cost of the fuel tank low. When fuel is pumped into a fuel tank of an automotive vehicle the fuel may contain a small amount of water. The water, being immiscible with gasoline settles to the bottom of the fuel tank and remains until it is dissipated in some fashion. Further, condensation can form on the inner surfaces of automotive fuel tanks which will then descend to the bottom of the tank and remain as a water globule until subsequently dissipated. Ordinarily, small amounts of water are typically present in most automotive fuel tanks at least some of the time during the life of the automotive vehicle. Water concentration for extended periods of time can and frequently does cause the bottom of the fuel tank to develop rust holes. When this occurs typically the fuel tank must be removed from the vehicle, any remaining fuel must be removed from the tank and then the tank may be patched by welding, brazing or by other form of repair. After being repaired, the fuel tank must then be reinstalled. The tank removal, repair and reinstallation operation is a considerably time consuming and expensive job that typically requires the vehicle to be out of service for an extended period of time. In some cases, it is more efficient to install a new fuel tank rather than attempting to repair a tank that has developed a leak.

In the case of the petroleum industry, vessels of various character are utilized to handle petroleum products. In a petroleum collection operations remote groups of tanks, typically known as tank batteries, are connected to the production lines of oil wells. These oil wells typically produce gas oil and water, together with certain other contaminants. The water and contaminates typically settle to the bottom of the tank and constitute basic sediment and water. The sediment and water, typically salt water, must be removed from time to time simply by draining it from the bottom of the tank. The lower portion of such tanks is subject to attack by the salt water and sediment and frequently develops leak holes. When such leak holes develop it is typically necessary to drain the tank, and then close the leak hole or holes by various patching or repairing operations including welding, brazing and sealing with other materials. Obviously a considerable amount of down time and labor is required for patching petroleum tanks in this manner. Also, the repair operations are expensive and detrimental to efficient production operations. Moreover, patching tanks by means of welding or brazing operations can be extremely hazardous from the standpoint of possible explosion in the event petroleum fumes remain in the tank after cleaning.

Also in the petroleum industry various other vessels are provided which contain pressurized fluid such as liquid and gas. These vessels may be closed static vessels or, in the alternative, may take the form of pipe lines handling flowing fluid material. Pipe lines and other pressure containing vessels for petroleum products must typically withstand the hazardous effects of salt water and other materials which attack the steel from which the vessels and pipe lines are composed. Where pipe lines are involved it is typically necessary to cut out a section of pipe and replace it with a new section. In the case of pressure containing petroleum vessels repair operations can be conducted by welding or, through application of patches of different nature. In some cases a leaking section of the pipe or a leaking vessel can be circumscribed by an external coupling which simply encloses the leaking area thus rendering the vessel or pipe line serviceable. Here again, a considerable amount and of expense and down time is typically involved in repair operations of this nature.

It is desirable therefore to provide a sealing assembly for sealing holes, cracks and the like in fluid containing vessels such as automobile fuel tanks, petroleum collection tanks, pressurized vessels, pipe, lines etc. It is also desirable to provide a sealing assembly rendering the user capable of establishing a positive seal to prevent leakage through holes and cracks in such vessels, which seal may be applied in a relatively short period of down time and through the use of low cost materials and service operations.

SUMMARY OF THE INVENTION

It is therefore a primary feature of the present invention to provide a novel sealing assembly for sealing holes, cracks and the like in fluid containing vessels which may be installed quickly and with a minimal amount of preliminary preparation for sealing operations.

It is even further feature to provide a novel sealing assembly utilizing a polymer material which establishes a sealed bond with the exterior surface of the tank or vessel within a relatively short period of time to thus enable the tank or vessel to be placed back in service with minimal down time.

It is also a feature of this invention to provide a novel sealing assembly for tanks and other vessels incorporating a sealing assembly which includes certain parts which are readily available in many hardware supply facilities.

It is another feature of this invention to provide a novel sealing assembly for tanks and other vessels which may be efficiently utilized to seal rust holes, cracks and other relatively small leak openings in vessels.

It is an even further feature of this invention to provide a novel sealing assembly for tanks and other vessels which enables repair of an otherwise leaking vessel so as to restore the vessel to its sealed, pressure containing capability.

Briefly a rust hole, or other leak in a tank or vessel may be repaired by first enlarging the hole to a predetermined minimum dimension. The external tank surface area around the leak hole is then cleaned. Thereafter, a retainer plate in the form of a large flat washer is provided and a machine screw or other force applying device is inserted through a hole in the central portion of the retainer plate. A stop assembly having pivotal stop wings that are movable between collapsed and expanded positions is threaded onto the screw member and collapsed to a position enabling it to be inserted through the enlarged hole in the tank or vessel. Once inside the vessel, the stop assembly is manipulated so as to open the pivotal stop wings to a position where the stop wings will engage the inner surface of the tank or vessel. After this as been accomplished a quantity of polymer sealing material is applied to the cleaned outer surface of the tank around the enlarged hole. The screw is then rotated to draw the stop assembly and retainer plate toward one another, thereby entraping a layer of polymer sealing material between the retainer plate and the outer wall surface of the tank. The polymer material will also fill the annular space between the enlarged hole in the tank and the screw member and, a small amount of the polymer sealing material will be squeezed through the hole in the tank and will flow onto the inner surface of the tank immediately about the hole. The polymer material will have been applied in its uncured, viscous liquid or pasty state and will become rapidly cured in place to form a rather hard sealing mass between the outer well surface of the tank and the retainer plate. The polymer sealing material will also establish a positive bond with the cleaned metal surface of the tank contacted thereby and with the screw member and retainer plate. The polymer sealing material will also become bonded to the wings of the stop assembly thus positively securing the stop assembly in its position relative to the machine screw. After curing of the polymer material a positive seal will have been formed. Thereafter, it may be desirable to cover the sealing assembly with a quantity of protective material such as automobile undercoating to thereby protect the sealing assembly against the formation of rust or other character of material degradation.

Where the leak in the tank or vessel is in the form of a crack, several closely spaced holes etc., a single retainer plate may be employed which is quite large and a plurality of screw and stop assemblies may be employed to secure the plate and polymer sealing material of the sealing assembly to the outer surface of the vessel.

BRIEF DESCRIPTION OF THE DRAWINGS

So that the manner in which the above recited features advantages and objects of the present invention are attained and can be understood in detail, more particular description of the invention, briefly described above, may be had by reference to the embodiments thereof which are illustrated in the appended drawings, which drawings form a part of this specification.

It is to be understood however that the appended drawings illustrate representative structural relationships that are made possible by employment of the particular devices set forth herein and are therefore not to be considered limiting of its scope, for the invention may admit to other equally effective embodiments without departing from the spirit and scope hereof.

IN THE DRAWINGS

Figure 1:
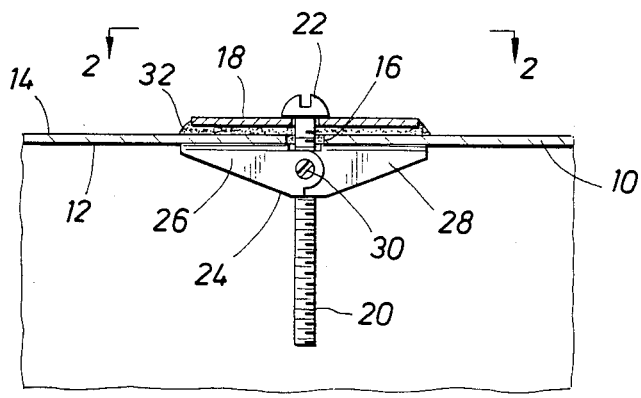

FIG. 1 is a sectional view of the wall structure of a tank or vessel having a hole therein which has been enlarged and showing a sealing assembly according to the present invention an operative sealing relation with the wall structure of the vessel.

Figure 2:
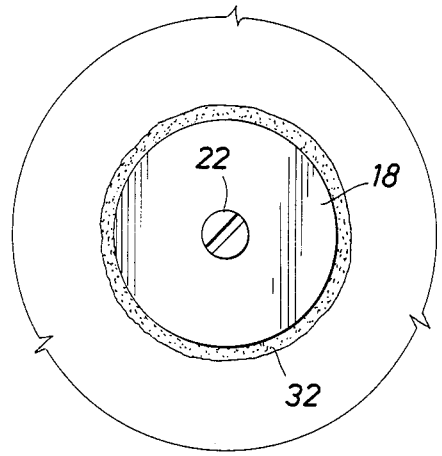

FIG. 2 is a plan view of the sealing assembly of FIG. 1.

Figure 3:
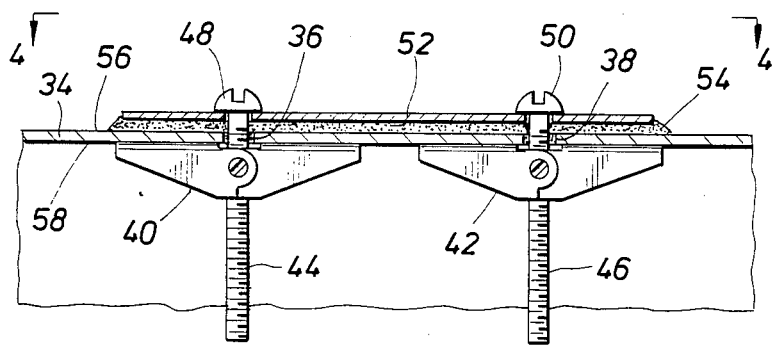

FIG. 3 is a sectional view of the wall structure of a vessel and illustrates a sealing assembly such as could be employed for sealing of multiple holes or a crack in the vessel, which sealing assembly is constructed in accordance with this invention.

Figure 4:
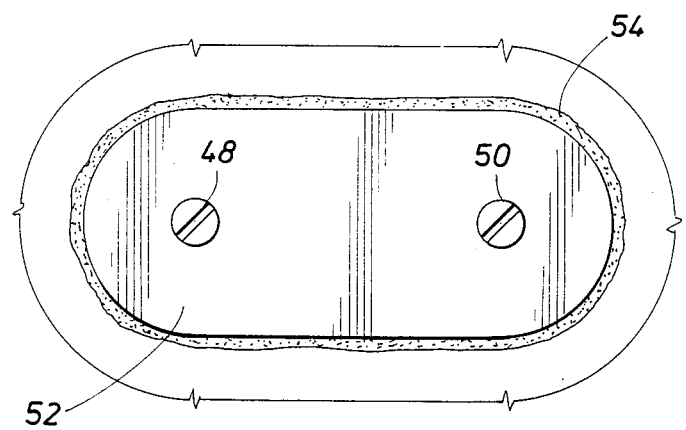

FIG. 4 is a plan view of the sealing assembly of FIG. 3.

DETAILED DESCRIPTION OF PREFERRED EMBODIMENT

Referring now to the drawings and first to FIG. 1 a wall structure of a tank or vessel is shown at 10 which may be a wall of a fuel tank of an automotive vehicle or which may take the form of a pressurized or unpressurized vessel of any sort or a pipe line etc. As shown in FIG. 1 "I" represents the interior of the vessel while "E" represents the exterior of the vessel. The vessel wall structure has an interior surface 12 and an exterior surface 14. Assuming that the vessel wall structure 10 is the wall of a fuel tank of an automotive vehicle of the like the tank may develop a rust hole such as due to the presence of water such as for example water globules on the bottom wall or condensate on the side and top walls. In such use the tank may begin to leak. Typically rust holes develop in the form of pin holes and leakage is in the form of slow seepage of fuel through the pin holes. In a short time however the rust holes widen and leakage then occurs as droplets. If not detected at this time, within a short period of time the holes will have enlarged to the point that the fuel leakage occurs in rapid droplets or a steady stream.

As was explained above when a fuel tank of an automotive vehicle begins to leak a fire hazard develops to the leaked fuel and the leaked fuel represents a significant expense to the operator. The fuel tank therefore must be repaired or replaced. Ordinarily, for repair or replacement it is necessary to remove the fuel tank from the vehicle and then remove the fuel from the tank. If the tank is to be repaired by welding or any other operation generating significant heat the fuel tank must be internally cleaned of fuel residue in order to minimize the hazard of explosion.

In accordance with the present invention, once a leak has been discovered it can be repaired quite quickly and efficiently and without necessitating removal of the fuel tank from the vehicle. First, the fuel is drained by siphoning or by any other suitable method. A drill is then utilized to enlarge the hole to the predetermined size for the character of repair that is to occur. Typically, a hole in the order of ⅜ of an inch is appropriate for the repair of most automotive fuel tanks.

An area about the hole in the order of 2 inches in diameter is typically cleaned of any foreign matters such as dirt, rust, undercoating, etc. Repair personel then mix a quantity of polymer sealing material which has an affinity for bonding to metal. Typically, a two part epoxy mixture is prepared with a catalyst being mixed with the raw polymer to form a fairly viscous paste-like material. The uncured sealing material is then spread onto the cleaned exterior surface area 14 of the tank immediately about the hole 16. A sufficiently thick layer of uncured polymer is deposited for polymer displacement as a retainer plate is forced against the polymer. A retainer plate 18 is then provided having a central opening through which the threaded portion 20 of a machine screw is able to freely pass. A stop assembly 24 is then threaded onto the threaded shaft portion of the screw. The stop assembly is provided with a pair of stop wings 26 and 28 which are interconnected by a pivot member 30. The stop assembly 24 is capable of being collapsed by pivoting the wings 26 and 28 together so that they are oriented substantially parallel with the threaded shaft portion of the screw. The shaft of the screw with the collapsed stop assembly is then inserted through the hole 16 in the tank wall 10 and the retainer plate 18 is brought into contact with the layer of uncured sealing material. The stop assembly is then manipulated in such manner as to cause the stop arms 26 and 28 to pivot outwardly to the expanded position thereof shown in FIG. 1. The screw 22 is then rotated so as to draw the stop assembly 24 and the retainer plate 18 toward one another. After a time the stop assembly fully engages the inner surface 12 of the tank 10 and the retainer plate engages the outer surface of the uncured sealing material. The screw is then rotated sufficiently to squeeze the uncured sealing material causing a portion of it to exit the space between the retainer plate and the outer surface 14 of the tank and thus form a rounded portion of sealing material circumscribing the retainer plate. Simultaneously, a small portion of the uncured sealing material is forced through the hole 16 in the tank so that a portion of it is squeezed onto the screw and onto the expanded stop assembly. Also a certain amount of the sealing material will be squeezed onto the inside surface 12 of the tank immediately about the hole 16.

In a short while, in the presence of the catalyst, the sealing material will cure to a hardened form and will establish a firm bond with all of the metal surfaces in contact therewith. It will become bonded to the exterior surface of the tank, to the retainer plate 18 about the screw member and, within the hole 16 the sealing member will firmly lock the stop assembly 24 in its retaining position thus preventing the stop assembly from becoming unthreaded from the screw. At this point sealing will have been completed and repair of the leak opening will have been accomplished. As further protection for the sealing assembly a small quantity of automotive undercoating may be employed to completely enclose the sealing assembly to thus prevent it from rusting and to provide it with protection against damage during subsequent operation of the vehicle.

If desired, the screw, retainer plate and stop assembly may be assembled and relative to the tank wall prior to introduction of the layer of sealant material. Before drawing the retainer plate and the stop assembly together, the retainer plate may be pulled outwardly, causing the expanded stop assembly to move into restraining engagement with the inner wall of the tank. When this is done, considerable space exists between the retainer plate and the outer wall. The sealant material may then be applied to the outer surface of the tank after which the screw may be rotated to draw the sealing assembly to the position shown in FIG. 1.

In the event the tank or vessel has multiple leak holes over a small area or has a small crack in its wall structure a sealing system may be employed in the manner illustrated in FIGS. 3 and 4. In these FIGS. a tank or vessel wall is shown at 34. At leak holes or at each end of a crack in the wall structure, holes 36 and 38 are drilled out to approximate size to allow passage of stop assemblies 40 and 42 therethrough. The stop assemblies may be identical to stop assembly 24 of FIG. 1, incorporating opposed stop wings movably interconnected by a pivot and having expanded and collapsed positions relative to the threaded portions 44 and 46 of screw members 48 and 50.

A retainer plate 52 of approximate size and configuration to cover a tank surface area significantly long and wider than the tank area defined by spaced holes 36 and 38 is formed with spaced holes registering with holes 36 and 38. These holes are of sufficient dimension to permit passage of the threaded portions 44 and 46 of the screws therethrough but are significantly smaller than the heads of the screws. The screws are first extended through the holes in the retainer plate and the stop assemblies are threaded onto the screws. With the stop wings in the collapsed positions thereof, the stop assemblies are inserted simultaneously though the enlarged holes 36 and 38 either before or after application of polymer sealing material to the cleaned external surface area of the tank. Typically, it will be more efficient to apply the polymer sealing material to the tank surface before insertion of the stop assemblies through the tank holes but such is not intended to limit the spirit and scope of this invention.

A layer of polymer sealing material 54 is positioned in the uncured state thereof on the outer wall surface 56 of the tank wall 34 the stop assemblies are extended through the respective openings 36 and 38 and are pivoted to the expanded position thereof as shown in FIG. 3 thereby causing the stop arms to engage the inner wall surface 58 of the tank wall. Upon rotation of the screws 48 and 50 the stop assemblies will be drawn tightly against the inner wall surface of the tank wall 34 and the retainer plate 52 will be drawn into tight, squeezing relationship with the layer of sealing material 54. This squeezing engagement causes the sealing material to squeeze out beyond the peripheral surface of the retainer plate 52 and also will cause a small amount the sealing material to be squeezed through the openings 36 and 38 and onto the stop assemblies and the screw members. The sealing material may also spread slightly onto the inner wall surface 58 of the tank wall immediately about the openings 36 and 38.

It should be born in mind that the retainer plate may take any suitable form appropriate for covering a desired external area of the tank or vessel being repaired. The forms of the retainer plate shown in FIGS. 2 and 4 are merely representative of two acceptable forms of the invention. The retainer plate may be composed of metal or, in the alternative, may conventiently tank the form of any suitable plastic material with sufficient structural integrity. The polymer sealing material may take the form of a two-part epoxy resin, one part being a catalyst for curing the basic polymer resin. The sealing material should be capable of establishing a positive sealing bond with the metal surfaces in contact therewith and should be resistant to deterioration by the fluid within the tank.

The screw member and the stop assembly may conveniently take the form of a simple toggle assembly such as may be readily purchased in most hardware stores. In order to withstand the corrosive effects of water and other contaminates, the screw member and stop assembly may be composed of stainless steel or any other suitable material.

After installation of the sealing assembly in the manner shown in FIGS. 3 and 4 it may be desirable to cover the entire sealing assembly with a layer of protective material such as conventional automotive undercoating. This will protect the sealing assembly against deterioration by weather and by contact with foreign objects as the automotive vehicle is used.

It should be born in mind that the tank or vessel represented by a wall in FIGS. 1 and 3, may be of any suitable form within the spirit and scope of this invention. The vessel may take the form of a pipe line, pressure containing vessel of any suitable shape and may contain any material that is compatible with the material from which the sealing assembly is composed.

In the fuel tanks of automotive vehicles, repair operations will take only a few minutes time after the fuel has been drained from the tank. It is not necessary to clean the tank except for cleaning the outer surface of the tank to a sufficient extent that the polymer sealing material will establish a positive bond therewith.

In view of the foregoing, it is respectfully submitted that the present invention is one well adapted to attain all of the objects and features hereinabove set forth together with other features which will be apparent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof it is to be understood that all matters hereinabove set forth or shown in the accompanying drawings are to be interpreted as illustrative and not in any limiting sense.

What is claimed is:

1. A sealing assembly for sealing holes, cracks and the like, in fluid containing vessels, comprising:
   (a) a toggle bolt having a pair of toggle wings being collapsible to a dimension such that said toggle wings can be passed through a small hole in said vessels, said toggle wings being expandable to a position bringing elongated surface portions thereof into force transmitting engagement with the inner surface of said vessel on opposed sides of said small hole;
   (b) a body of polymer sealing material covering a portion of the exterior surface of said vessel surrounding said small hole and closing said small hole, said polymer material being applied in a soft uncured state and curing to a hardened form and establishing sealing with said tank;
   (c) a retainer plate engaging said body of polymer material; and
   (d) said toggle bolt having an elongated threaded bolt portion forcing said retainer means and said stop means toward one another and thus forcing said retainer plate tightly against said polymer sealing material and forcing said polymer sealing material tightly against the external surface of said vessel.

2. A sealing assembly as recited in claim 1, wherein said polymer sealing material establishes a bond with the wall structure of said vessel, closes said small hole and forms a fluid tight seal and mechanical locking with said elongated threaded bolt portion of said toggle bolt.

3. A sealing assembly as recited is claim 1, wherein said elongated bolt portion of said toggle bolt extends through a hole in said retainer plate and said small hole in said vessel and is operative to force said stop means of said pair of toggle wings against the inner surface of said vessel in the expanded condition thereof.

4. A sealing assembly as recited in claim 1, wherein said polymer material is applied to said vessel in the viscous liquid uncured state thereof and cures to a hardened mass closing said small hole and sealing said vessel and locking said screw means and said toggle wings in assembled expanded relation.

5. A sealing assembly for sealing holes, cracks and the like in a wall of a fluid containing vessel, comprising:
   (a) a pair of pivotally interconnected toggle wings each defining elongated stop surface means for engaging the inner surface of said wall and being collapsible to a small dimension permitting insertion thereof through a hole of predetermined small size in said wall, said toggle wings being expandable to a position engaging said inner surface of said wall on opposite sides of said hole;
   (b) a retainer plate of a dimension to cover a selected portion of the external surface area of said vessel, said retainer plate defining a hole;
   (c) a quantity of polymer sealing material applied in the uncurred viscous paste-like state thereof in a layer on said selected external surface area of said vessel, said polymer sealing material having an affinity for establishing a sealed bond with said said external surface of said vessel and with said toggle wings and retainer plate upon curing to a substantially hardened sealing mass; and
   (d) screw means for retaining extension through said hole of said retainer plate and for threaded engagement with said toggle wings, said screw means being rotatable to draw and retainer plate against said layer of polymer sealing material and to draw said toggle wings into restraining force transmitting engagement with said inner surface of said wall of said vessel said polymer sealing material locking said screw means and said toggle wings against relative movement upon becoming cured.

* * * * *